(12) United States Patent
Reffett

(10) Patent No.: US 7,475,912 B1
(45) Date of Patent: Jan. 13, 2009

(54) COMBINATION SHIPPING LABEL AND PACKING SLIP FORM

(75) Inventor: Ted J. Reffett, Woodstock, IL (US)

(73) Assignee: The Standard Register Company, Dayton, OH (US)

( * ) Notice: Subject to any disclaimer, the term of this patent is extended or adjusted under 35 U.S.C. 154(b) by 525 days.

(21) Appl. No.: 10/693,469

(22) Filed: Oct. 24, 2003

(51) Int. Cl.
*B42D 15/00* (2006.01)
*B32B 9/00* (2006.01)
*B32B 33/00* (2006.01)

(52) U.S. Cl. .......................... 283/81; 283/98; 283/101; 283/103; 283/105; 428/42.2; 428/42.3

(58) Field of Classification Search .................. 283/81, 283/94, 100, 101, 103, 105–111; 428/40.1, 428/42.1–42.3; 40/312; 229/74
See application file for complete search history.

(56) References Cited

U.S. PATENT DOCUMENTS

| | | | |
|---|---|---|---|
| 3,524,782 A * | 8/1970 | Buske ......................... | 156/248 |
| 4,495,582 A | 1/1985 | Dessert et al. | |
| 5,088,961 A | 2/1992 | Sprain | |
| 5,255,456 A * | 10/1993 | Franklin ................. | 40/124.191 |
| 5,340,158 A | 8/1994 | Bartl | |
| 5,484,170 A | 1/1996 | Hatfield, Jr. | |
| 5,518,787 A * | 5/1996 | Konkol ......................... | 428/43 |
| 5,618,064 A | 4/1997 | Main | |
| 5,730,469 A | 3/1998 | Heimerdinger et al. | |
| 5,735,549 A * | 4/1998 | Konkol et al. ................. | 283/81 |
| 5,752,722 A | 5/1998 | Moore et al. | |
| 5,776,571 A | 7/1998 | Michlin et al. | |
| 6,015,167 A | 1/2000 | Savino et al. | |
| 6,167,679 B1 * | 1/2001 | Horton-Steidle et al. ...... | 53/411 |
| 6,186,554 B1 | 2/2001 | Raming | |
| 6,213,518 B1 | 4/2001 | Raming | |
| 6,244,629 B1 | 6/2001 | Chess | |
| 6,364,364 B1 | 4/2002 | Murphy | |
| 6,383,592 B1 * | 5/2002 | Lowry et al. ................ | 428/40.1 |
| 6,589,623 B2 | 7/2003 | Roth | |
| 7,048,308 B2 * | 5/2006 | Blank .......................... | 283/81 |
| 2002/0134497 A1 * | 9/2002 | Roth .......................... | 156/249 |
| 2004/0195824 A1 * | 10/2004 | Blank .......................... | 283/81 |

* cited by examiner

*Primary Examiner*—Derris H Banks
*Assistant Examiner*—Pradeep C Battula
(74) *Attorney, Agent, or Firm*—Dinsmore & Shohl LLP

(57) ABSTRACT

A form containing both a pair of labels. In one configuration, the labels can be a shipping label and packing slip. The form is configured such that variable indicia can be printed on a first ply of both labels from a simplex (one-sided) printer. In one configuration, the packing slip and shipping label define a pair of labels across the front of the first ply such that the two labels are substantially coplanar with one another. Alignment of a first ply, second ply and adhesive and release layers disposed between the first and second plies, as well as placement of lines of weakness through one or more of the plies and layers facilitates formation of the shipping label and packing list that can, after accepting printed indicia on the first ply from a one-sided printer, be removed from one another such that they can be affixed to a package. In another configuration, portions of one of the shipping label and packing list can be made to overlay one another such that respective fronts of the first ply are not substantially coplanar with one another.

39 Claims, 14 Drawing Sheets

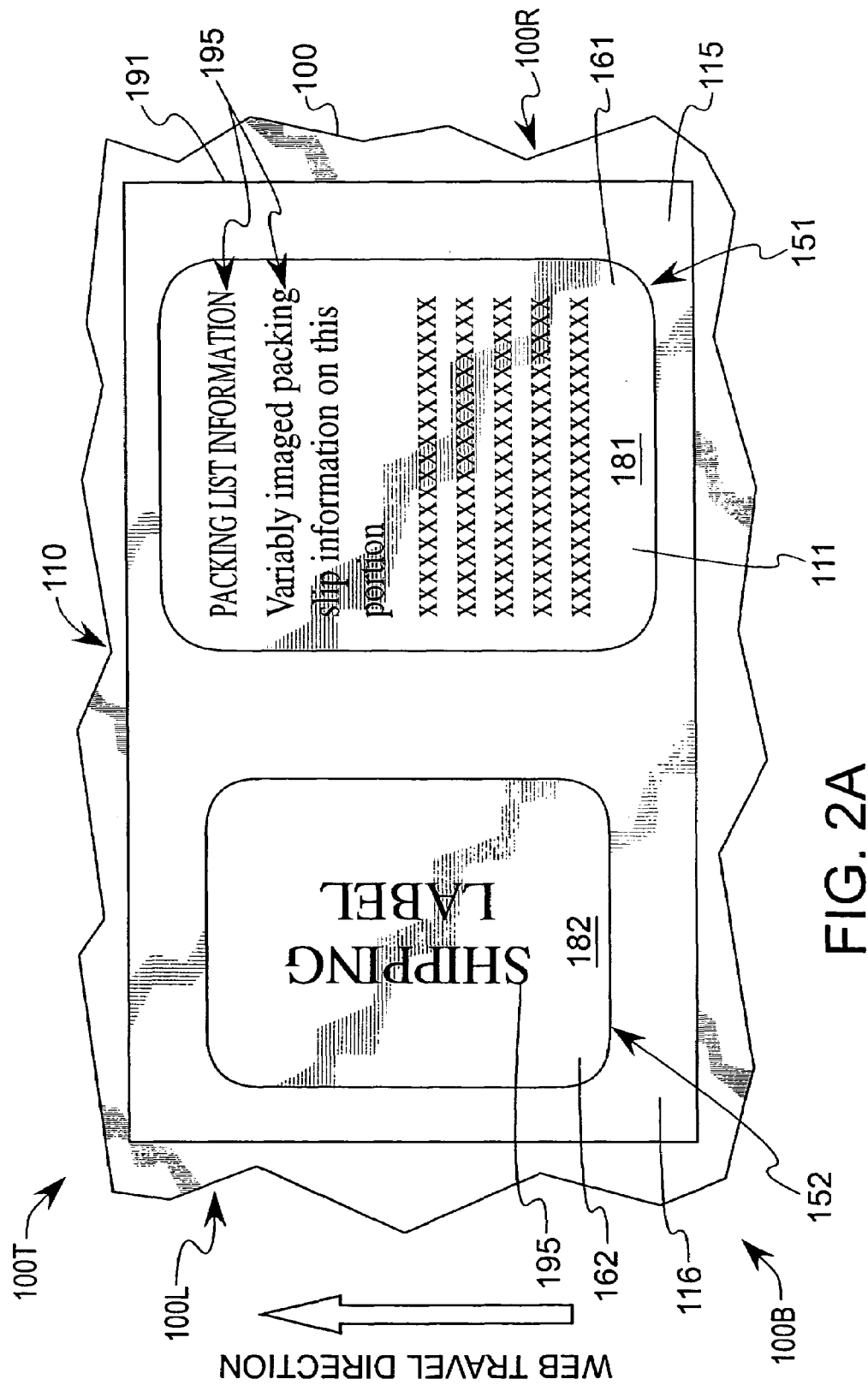

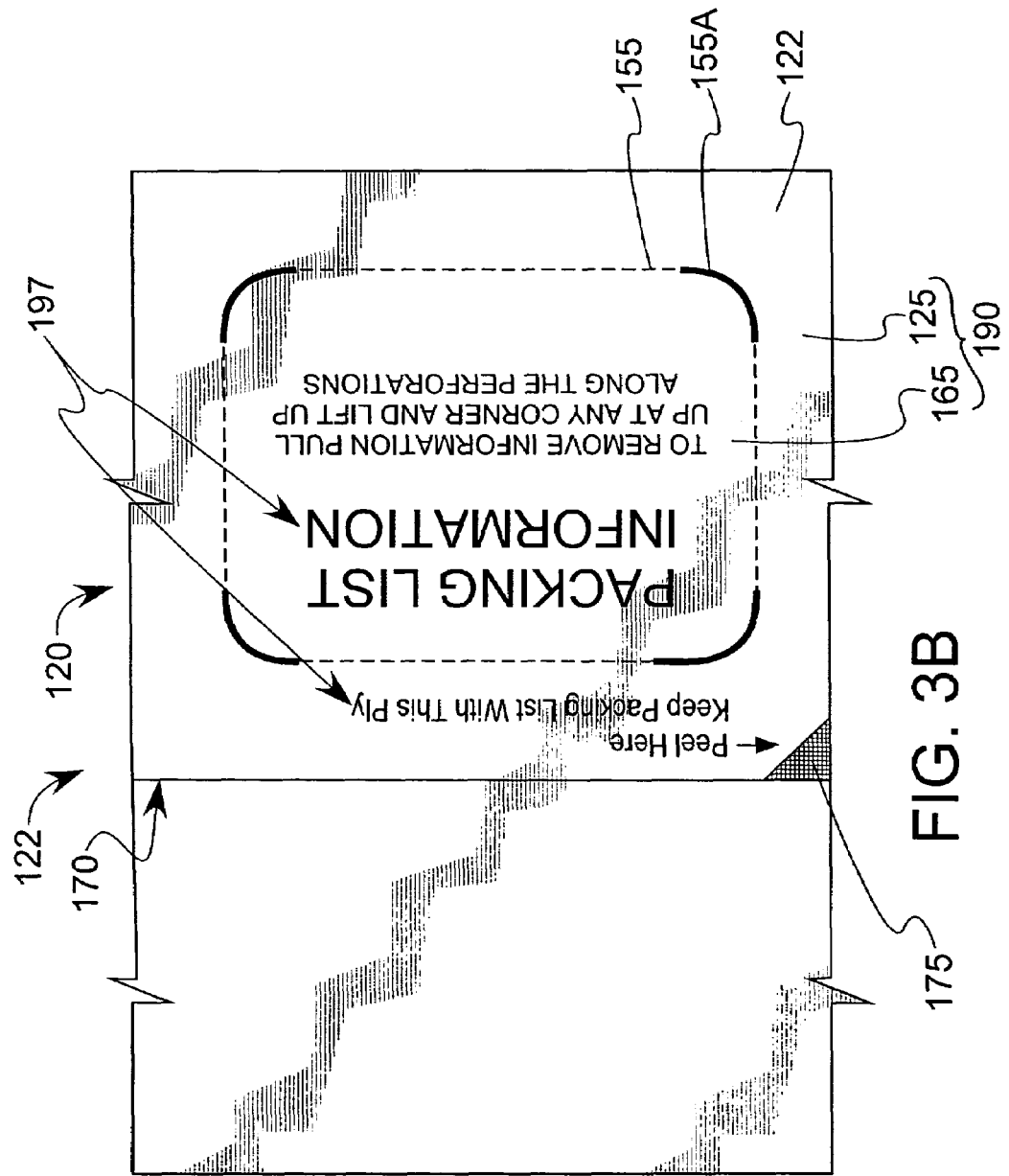

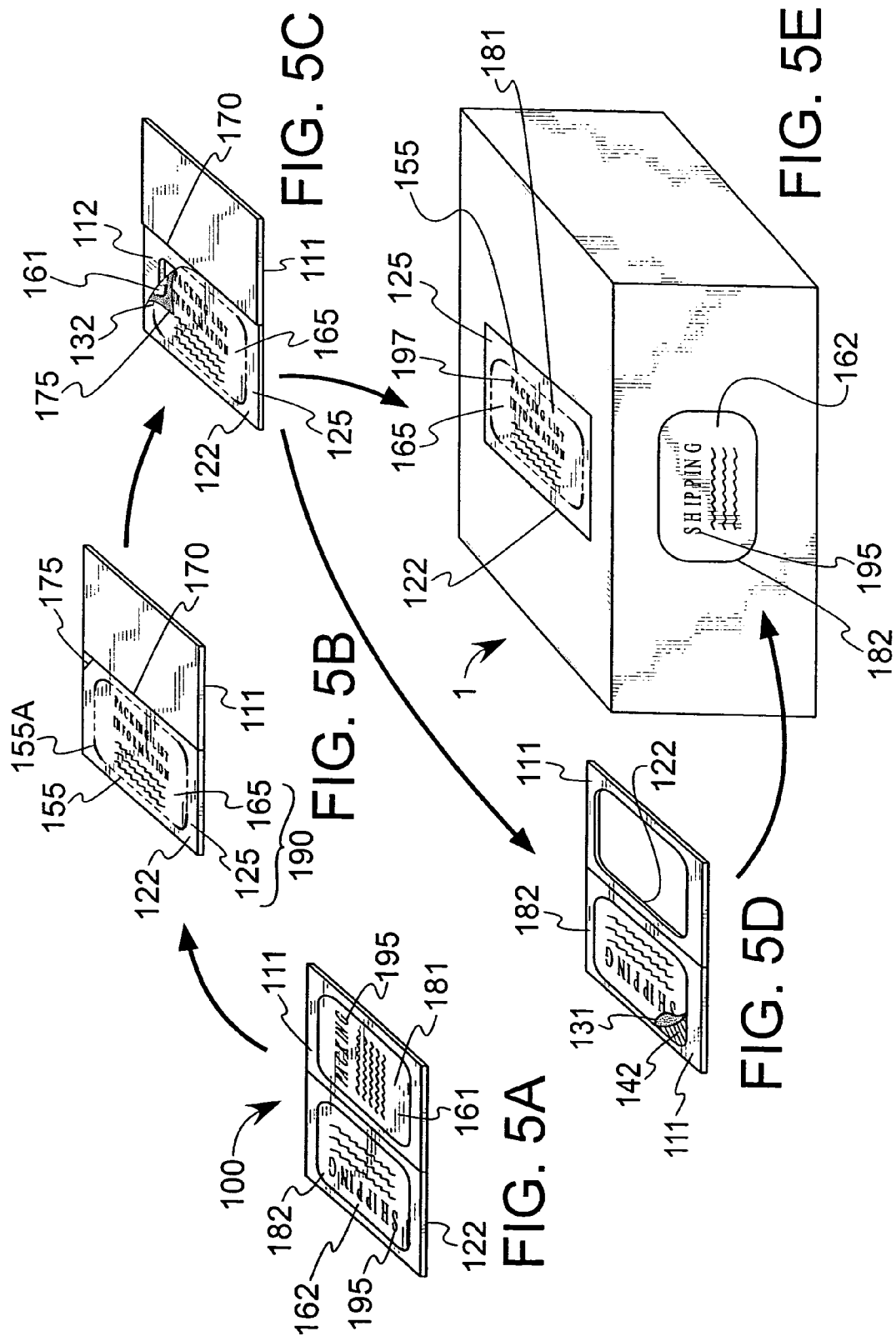

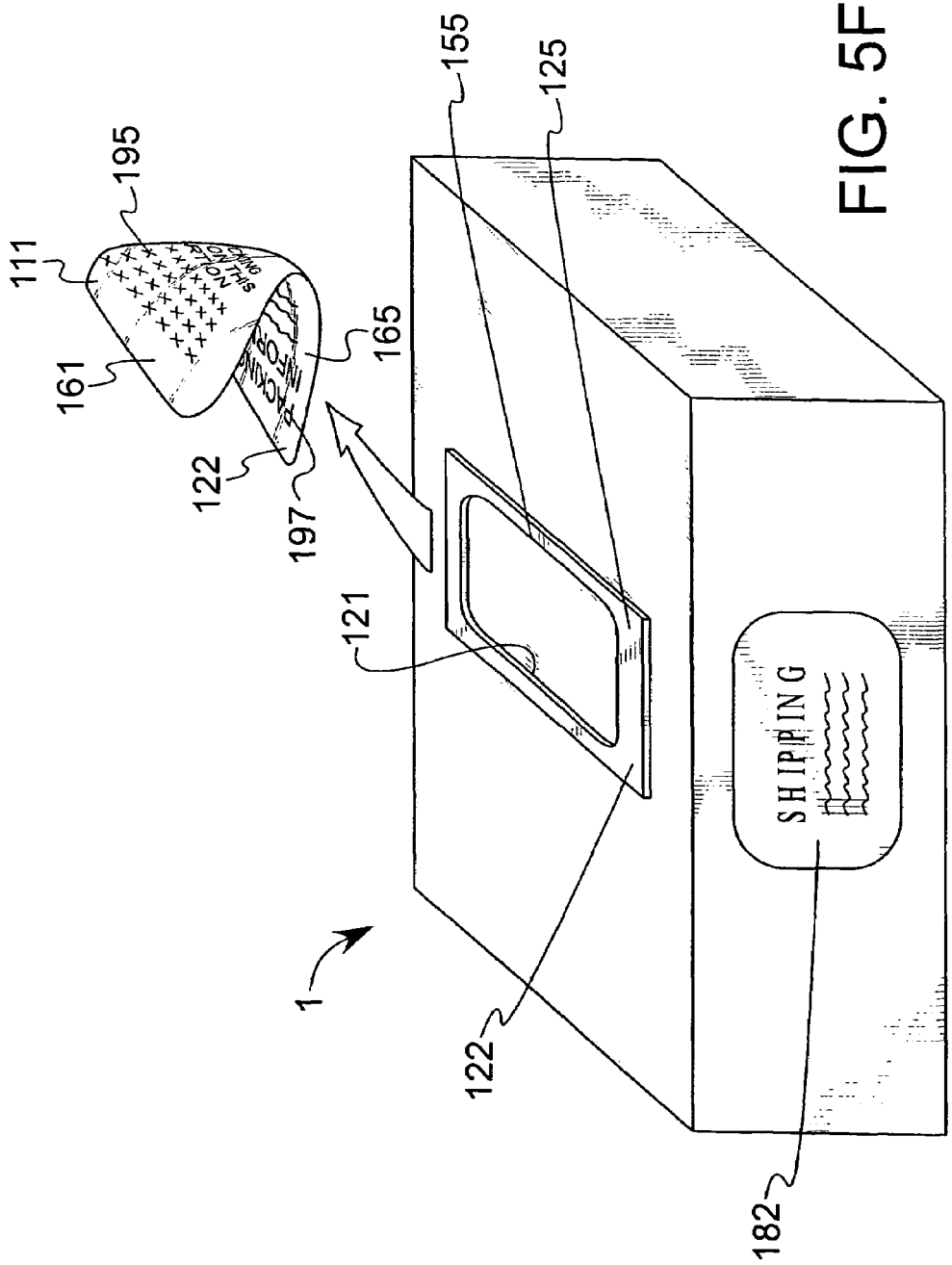

COMBINATION SHIPPING LABEL AND PACKING SLIP FORM

BACKGROUND OF THE INVENTION

This invention relates generally to a form for receiving printed information thereon and subsequent attachment to an object, and more particularly to a combination shipping label and packing list form for use in commercial package shipping where the shipping label and packing list information can be printed to a single side of the form in a simplex printing operation prior to placement of the form onto a package or related shipping container.

The use of adhesive forms in the transport of commercial goods is well known in the art. Typical among these are shipping labels and packing lists, the first to identify the addressee of goods contained within a package to which the shipping label is affixed, and the second to identify the contents within the package being shipped. The forms can be of single or multiple layer configurations, and often include a pressure-sensitive adhesive coating. Such forms can be removably affixed to a backing sheet. Upon removal of a form from its associated backing sheet, which is typically a paper liner with a silicone (or similar release material) coating, the exposed adhesive allows the form to be fastened securely to a package for shipment. Traditionally, packing lists have been prepared separately from their corresponding shipping labels. This process has numerous shortcomings. In addition to requiring that additional sheets of paper or film be affixed to the package in separate steps, there is the added disadvantage that the addressee of a shipping label might not correspond to the list of contents inside the package. Additional steps (with concomitant cost) are required where the shipping label, packing list or both are placed inside a transparent pouch that is then affixed to the package. In addition, by exposing the packing list to inspection, the likelihood of theft may increase, especially if these contents are very valuable. Similarly, combinations of shipping labels and packing lists that necessitate one or more folding steps to affix the final form to a package involve hand labor which results in an increasingly expensive system.

What is needed is a combination form that improves the security and efficiency in the shipping of a package such that the number and size of the sheets in the form are minimized while providing for ease of printing and subsequent application.

SUMMARY OF THE INVENTION

These needs have been met by the present invention. In a first aspect of the invention, an adhesive form is disclosed. The form includes a first ply, a second ply and adhesive and release layers disposed between the two plies. Each of the plies includes front and back faces on opposite ply surfaces. The front of the first ply defines a first ply first printable region and a first ply second printable region, each of which are separable from the first ply along a line of weakness that extends at least through the first ply. The front of the second ply and the back of the first ply face one another such that the two plies define a substantially stacked relation, while the back of the second ply defines a separable region that includes a second ply printable region and an affixing region adjacent the second ply printable region. In the present context, the term "substantially" refers to an arrangement of elements or features that, while in theory would be expected to exhibit exact correspondence or behavior, may in practice embody something slightly less than exact. As such, the term denotes the degree by which a quantitative value, measurement or other related representation may vary from a stated reference without resulting in a change in the basic function of the subject matter at issue. Furthermore, when two things are "adjacent" one another, they can be so either in an above-below (such as stacked planar sheets), surrounded, edge-to-edge or similar relationship. While the things in question need not be contiguous to be considered adjacent, they should be in such close proximity that significant intervening structure is not disposed in between. As with the aforementioned first ply first and second printable regions, the second ply printable region is separable from the second ply along a line of weakness that extends at least through the second ply. The affixing region can form a border around the second ply printable region. By the present construction, the first ply first printable region and the second ply printable region are substantially coextensive with one another. The adhesive layer is disposed between at least a portion of the back of the first ply and the front of the second ply such that a bond is formed between the plies, while a release layer disposed between at least a portion of the back of the first ply and the front of the second ply to allow selective separation where the release layer and adhesive layer are in contact with each other. Between them, they allow removal of a first label defined by the separable region (on the second ply) and the first printable region (on the first ply) such that, upon the removal of the first label from the form, the adhesive layer disposed on the front of the second ply opposite the affixing region becomes exposed. Once this portion of the adhesive is exposed, the first label can be adhesively affixed to an object (such as a package to be shipped). The release layer and the adhesive layer are further configured to allow selective removal of a second label defined by the first ply second printable region. As such, the patterns defined by the adhesive and release layers need not be the same across the entire form, as what is needed for the first label may differ from that of the second label. The second label includes a portion of the adhesive layer that, upon the removal of the second label, becomes exposed such that the second label can subsequently affixed to an object. The form is configured such that at least the printable regions corresponding to the front of the first ply can accept printed indicia thereon from a single pass through an automated simplex printing device.

Optionally, the separable region is at least partially bounded along a cut line in the second ply. Preferably, the configuration of the adhesive and release layers is such that the second ply printable region is permanently adhered to the first ply first printable region. In the present context, terms implying "permanent" adhesion include situations where the adhesion between two adjoining surfaces is such that a subsequent attempt to separate the surfaces results in damage done to either or both of them, or the adhesive properties of the adhesive are severely curtailed. In addition, the form can be made from a discrete cut sheet. This permits stacks of forms to be mounted in a conventional printer tray. Examples of printers compatible with the present forms include, but are not limited to, non-impact laser printers, ink jet printers, and thermal transfer printers, as well as impact dot matrix, train, band and daisy wheel printers. As an alternative, forms according to the present invention may be included in a continuous roll or flat pack. In one embodiment, the top surfaces of the first and second labels are substantially coplanar. Moreover, the second plies of the first and second labels can be formed from a common substrate such that the entire form rests upon a single sheet or web of unitary structure. The first ply second printable region can be disposed laterally or longitudinally adjacent the first ply first printable region on the form. Preferably, the first label defines a packing list, while the second label defines a shipping label. In other configurations, the first label can define at least one pricing label, return receipt, return label or coupon.

In one form construction, the two plies that make up the form can be made from separate webs that are subsequently combined and held together by adhesive. In one configuration, an adhesive layer can be disposed across a substantial entirety of the front of the second ply that corresponds to the packing list, while another adhesive layer is disposed across a substantial entirety of the back of the first ply corresponding to the second label. In much the same way, the release layer can be disposed between the first and second plies of the first label in a pattern such that it only occupies the portion outside the corresponding line of weakness defined in the first ply first printable region, or within the region circumscribed by the line of weakness defined in the first ply second printable region. It will be appreciated that the adhesive that makes up the various patterns can all be from the same adhesive material, or can be formed from differing adhesives, depending on the need. Similarly, the material making up the release layer can all be formulated from the same material, or from various materials. The lines of weakness can be made from a full die cut or a perforated die cut. More particularly, at least one of the lines of weakness is substantially rectangular in shape where the corners may be rounded for grasping by a user. In one form, the lines of weakness corresponding to the first and second labels in the first ply are full die cuts, while the line of weakness corresponding to the first label in the second ply is a perforated die cut. In cases where the die cut in the second ply is perforated, at least one corner (which may include the aforementioned rounding) defined in the perforated die cut comprises a full die cut to facilitate ease of grasping. In addition, pre-printed indicia can be placed on a portion of the back of the second ply, including on one or both of the second ply printable region or the affixing region. By way of example, the pre-printed indicia comprises instructional information.

In yet another option, an indicator is disposed across the first and second labels to provide indicia that the first and second labels are grouped together. In one embodiment, the indicator is a line printed across or around the first and second labels. In a more particular embodiment, the line can form a continuous pattern such as a rectangle that straddles both labels. The form can further comprise an overlap region between the labels such that a seam is formed by the overlap. This overlap region is configured such that either a coplanar or non-coplanar form is created. In the non-coplanar configuration, a glue layer adheres a portion of the front of one ply corresponding to one of the labels to a portion of the back of the other ply corresponding to the other of the labels. Additionally, portions of one of the plies and the release layer that both correspond to one of the labels can be removed prior to construction of the form such that a cutout defined by the removed portion is substantially coextensive with a corresponding portion of the other label. In the coplanar configuration, one surface of the overlap region is bounded on a lateral side by two abutting first plies. The plies that abut to form this portion of the overlap region make up a first side of a packing list and first side of a shipping label. The other (opposing) surface of the overlap region is bounded on a lateral side by two abutting second plies. In a manner similar to that of the abutting first plies discussed above, the abutting plies form respective second sides of the packing list and shipping label. The abutting first plies are laterally offset relative to the abutting second plies such that the portion of the form disposed between the lateral offset defines the overlap region. In either the coplanar or non-coplanar constructions, the first label may be made from a first material while the second label can be made from a second material, and the two materials need not be the same.

According to another aspect of the invention, a multi-label form is disclosed. The form is configured such that each label can accept variable simplex printing on at least one surface and be separately affixed to an object. The form includes a first label and a second label, and is constructed generally similar to that of the previous aspect, where each label includes first and second plies with one or more release layers and one or more adhesive layers in between. In addition, a cut line formed in the second ply defines an edge of an area that encompasses a second ply printable region and a border about the printable region. The border adjacent the second ply printable region is similar to the affixing region discussed above in conjunction with the first aspect. Upon removal of the first label from the form along the cut line, the plies remain attached to the border formed in the area, while a portion of the adhesive layer that remains disposed on the second ply opposite the border becomes exposed to form a picture frame-like adhesive surface such that the first label can be affixed to the object along the exposed adhesive surface. Optionally, the release layer of the first label is patterned. As previously discussed, the various release layers may be made from the same or different materials. In addition, the fronts of the two labels can be either substantially coplanar with each other, or may include an overlap region such that a portion of the form that corresponds to one of the labels adhesively overlaps a portion that corresponds to the other of the labels. As before, a preferable configuration for the form includes a packing list and a shipping label.

According to yet another aspect of the invention, a packing list and contiguous shipping label form configured to be affixed to an object are disclosed. The packing list includes a first ply, a first line of weakness formed in the front of the first ply such that a first printable region is bounded by the first line of weakness, a patterned release layer facing the back of the first ply, an adhesive layer facing each of the back of the first ply and the patterned release layer, a second ply facing the adhesive layer such that at least a portion of the front of the second ply is bonded to at least a portion of the back of the first ply to define a multi-ply label, a second line of weakness formed in the back of the second ply such that a second printable region is bounded by the second line of weakness. The shipping label includes a first ply configured to receive variable indicia printed thereon, a line of weakness formed in the front of the first ply such that a printable region is bounded thereby, an adhesive layer facing the back of the first ply, a release layer facing at least a portion of the adhesive layer and a second ply opposite the front such that the front of the second ply faces the release layer.

Optionally, the second line of weakness of the packing list is disposed substantially coextensive with the packing list first line of weakness. In addition, the form includes a separable region disposed about the packing list second line of weakness, and a border region disposed about the shipping label line of weakness. As with the previously-discussed aspects, the separable region includes a printable region and an affixing region adjacent the printable region. The form is configured such that the fronts of the first plies of the shipping label and the packing list are preferably substantially coplanar with one another either overlapped or non-overlapped as previously discussed), although it will be appreciated by those skilled in the art that the aforementioned overlap configuration that produces non-coplanar first plies is also contemplated.

BRIEF DESCRIPTION OF THE DRAWINGS

FIG. 2A is top view of a first ply of the form FIG. 1, where a shipping label is disposed laterally relative to a packing list;

FIG. 3B is a bottom view of the second ply of FIG. 3A;

FIG. 5A is a perspective view of the form of FIG. 1 after having received variable indicia printed thereon;

FIG. 5B is a perspective view of the opposite surface of the form of FIG. 1, showing details of the form's second ply;

FIG. 5C is a perspective view of a first label being peeled away from the second ply of FIG. 5B;

FIG. 5D is a perspective view of the form of FIG. 5A, showing a second label being peeled away from the form's first ply;

FIG. 5E is a perspective view of a package to be shipped having the first label of FIG. 5C and the second label of FIG. 5D affixed thereto;

FIG. 5F is a perspective view of a package to be shipped having a packing list being removed from the first label of FIG. 5C, while the second label of FIG. 5D remains affixed to the package.

DETAILED DESCRIPTION OF THE PREFERRED EMBODIMENTS

Figure 1:
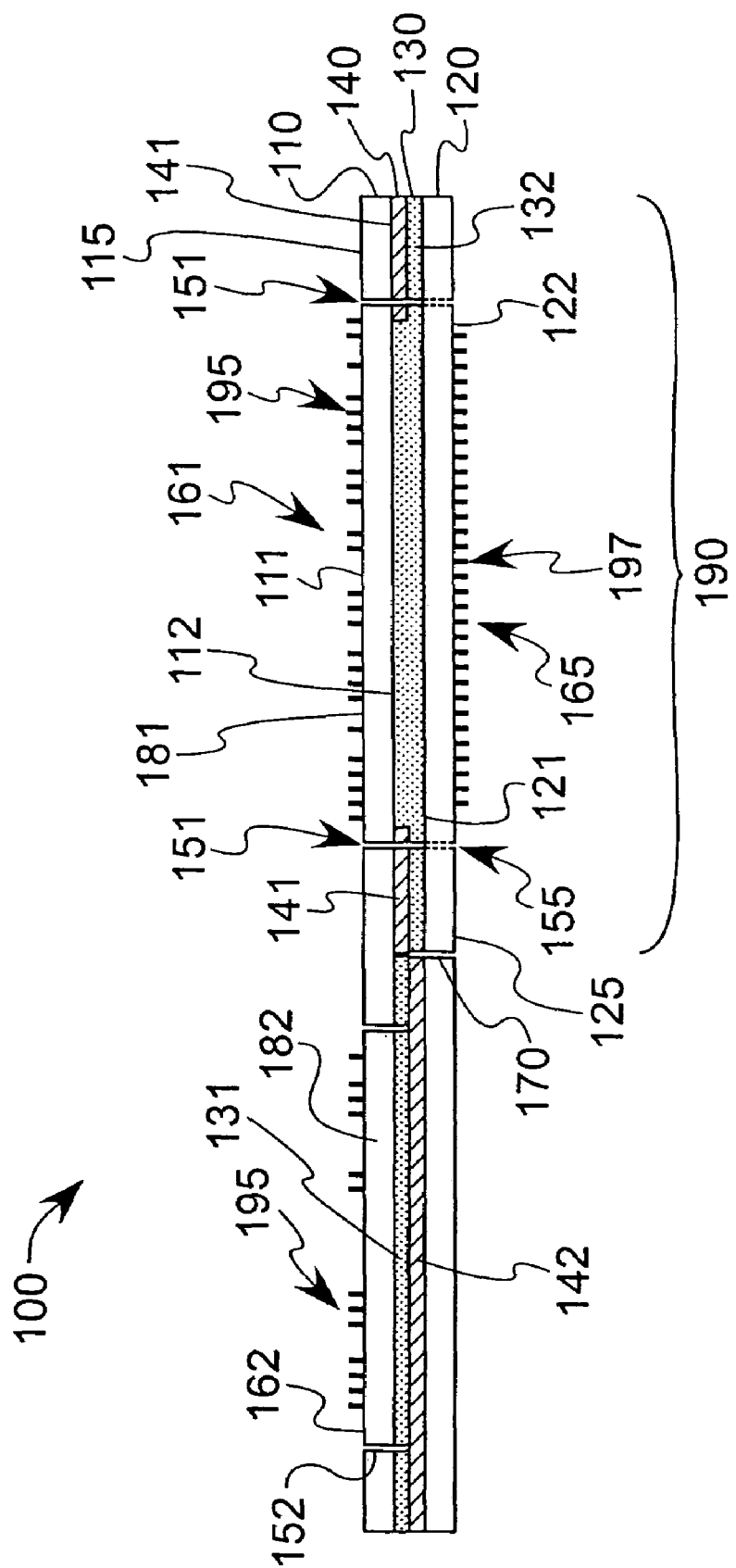
FIG. 1 is an elevation view of the form of the present invention, highlighting the multiple plies of the form.

Referring first to FIG. 1, a multi-ply form 100, made up of a first ply 110, second ply 120, adhesive layer (generally indicated as 130) and release layer (generally indicated as 140) is shown. The first ply 110 includes a front 111 and a back 112, where the front 111, being made from a material suitable for writing on (such as paper and some plastics), can accept printed indicia 195. Lines of weakness 151, 152 and 155 disposed within the plies allow portions of the ply surfaces that correspond to one or more labels to be separated from form 100. In particular, a first label line of weakness 151 disposed within first ply 110 defines a first ply first printable region 161, while a second label line of weakness 152 disposed in first ply 110 defines a first ply second printable region 162. The lines of weakness 151, 152 define a substantially rectangular shape on the front 111 of first ply 110, where the corners of the lines of weakness 151, 152 can be (although aren't required to be) slightly rounded. Second ply 120 includes a front 121 and back 122, where the back 122 (similar to front 111 of the first ply 110) is made of a material compatible with accepting printed indicia. Also similar to the first ply 110, the second ply 120 includes one or more lines of weakness 155 that are substantially aligned with lines of weakness 151 on the first ply 110 to define a second ply printable region 165 therein. The release layer 140 can be made up of a series of patterns, where a first release layer pattern 141 is placed in contact with back 112 of first ply 110, while a second release layer pattern 142 is placed in contact with front 121 of second ply 120. Similarly, the adhesive layer 130 can be made up of a series of adhesive patterns, where a first adhesive layer pattern 131 is placed in contact with back 112 of first ply 110, while a second adhesive layer pattern 132 is placed in contact with front 121 of second ply 120. The various patterns between the adhesive layer 130 and the release layer 140 are such that together they can define a relatively constant thickness between the first and second plies 110, 120 of the form 100. In one configuration, the release layer 140 may be placed directly on one of the plies, while in another a primer coat may be applied between the two to promote uniformity in the release layer 140. The patterning in first release layer pattern 141 leaves the portion of back 112 that corresponds to first ply first printable region 161 exposed, thereby allowing it to be in direct, facing contact with second adhesive layer pattern 132 that is disposed on second ply 120 so that a permanent bond is formed therebetween. The second adhesive layer pattern 132 preferably occupies the substantial entirety of the front 121 of the second ply 120 that underlies first ply first printable region 161 and the border 115 that surrounds it. It additionally adhesively couples the back 112 of first ply 110 and the front 121 of the second ply 120 such that first label 181 is constructed as a permanently bonded multi-ply label with two printable surfaces. It will be appreciated that the relative thickness of the plies, release layer and adhesive layer shown in the figures are not shown to scale, but are shown exaggerated for illustrative purposes to more clearly show particular attributes of the invention. A cut line 170 extends through second ply 120, thus facilitating ease of removal of the first label 181 from the form 100. Label 181 is collectively made up of affixing region 125, first ply first printable region 161 and second ply printable region 165. As will be shown and described later, after removal of the first label 181 defined by first ply first printable region 161, second ply printable region 165 and its surrounding affixing region 125 from the form 100, the first label 181 can then be adhered to the surface of an object, such as a package to be shipped.

As can be seen in the figure, the top surfaces of the labels 181, 182 disposed on the front 111 of first ply 110 are coplanar. The second label 182 is stacked over a corresponding part of second ply 120, where first adhesive layer pattern 131 and second release layer pattern 142 are disposed between the two plies. Also, one or more lines of weakness 152 extend at least through the first ply 110 and the first adhesive layer pattern 131 so that the first ply second printable region 162 that accepts printed indicia 195 and the portion of first adhesive layer pattern 131 beneath it can be removed from the remainder of form 100. As with the line of weakness 151 that circumscribed the first ply first printable region 161, this line of weakness is preferably a full die cut. While the second label 182 also includes an adhesive layer 131 and release layer 142 disposed between the back 112 of first ply 110 and the front 121 of second ply 120, its configuration differs from that of the first label 181. For example, whereas the second adhesive layer pattern 132 of the first label 181 was generally underneath the first release layer pattern 141, in second label 182 the first adhesive layer pattern 131 is over its corresponding second release layer pattern 142. Furthermore, as will be shown and described below, second release layer pattern 142 occupies the substantial entirety of the portion of the front 121 of second ply 120 that will form the second label 182. The first adhesive layer pattern 131 faces the back 112 of first ply 110, and is configured to maximize the amount of adhesive surface coverage that the second label 182 has once it and its corresponding part of first adhesive layer pattern 131 is removed from the remainder of the form 100. The back 122 of second ply 120 defines a substantially flat lower surface. In addition, the back 122 of second ply 120 defines a unitary (one-piece) substrate that gets divided upon the presence of a cut line 170 that is preferably continuous.

Figure 6:
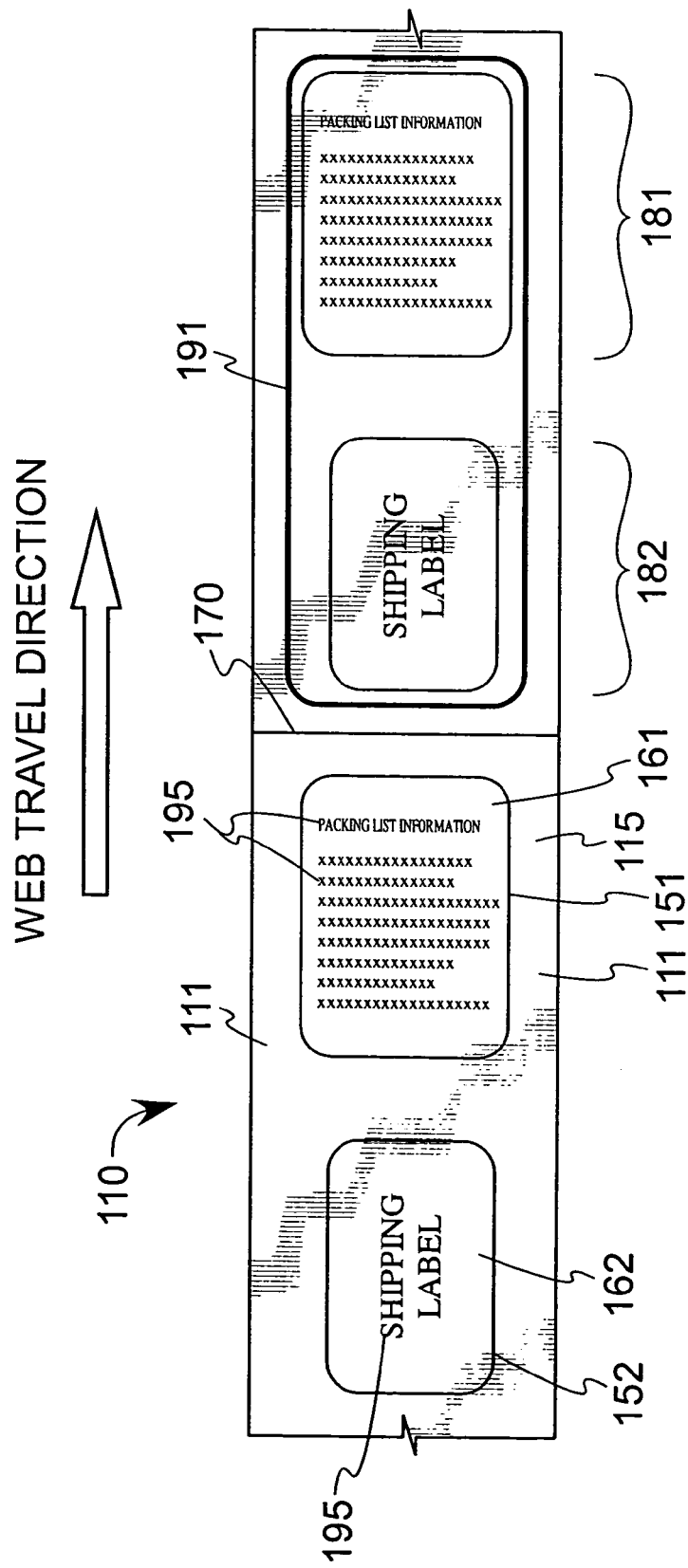
FIG. 6 is a variation of the form shown in FIGS. 1-5, showing the shipping label disposed longitudinally relative to the packing list.

Referring next to FIGS. 2A and 6, a top view of form 100 is shown, emphasizing the front 111 of first ply 110. Left and right side lateral edges 100L, 100R and top and bottom edges 100T, 100B define the outer dimensions of form 100. Labels 181, 182 are configured to contain printed indicia that can be disposed within the printable regions of the first and second plies. In one configuration, first label 181 makes up a packing list while the second label 182 makes up a shipping label. In this configuration, depicted with particularity in FIG. 2A, first label 181 and second label 182 are disposed laterally adjacent one another. An arrow indicates the direction a web of forms 100 travels as it is being fed into a printing device (not shown). As shown with particularity in FIG. 6, the labels may be alternately disposed longitudinally relative to one another. It will be appreciated that either configuration is compatible with the present invention, and furthermore, that either configuration can be used for discrete, cut sheets or continuous versions of the form 100. Printed indicia 195 defines information pertinent to a shipping label (as shown in first ply second printed region 162) and a packing list (as shown in first ply first printed region 161), while lines of weakness 151, 152 define the removable portions of the labels 181, 182 respectively that can be subsequently affixed to a package (not presently shown). Preferably, the lines of weakness 151, 152 are full die cuts, rather than a perforated cut, thereby promoting a more clean, less jagged separation. A border 115 surrounds first ply first printable region 161, while a border 116 contiguous with border 115 surrounds first ply second printable region 162. The printed indicia 195 contained on first ply first printable region 161 is preferably hidden from view until accessed by the intended recipient of the package. Accordingly, it is placed face-down on the package, where the exposed adhesive (shown and described later) secures the two together. Contrarily, the construction of the shipping label disposed within second label 182 is such that the printed indicia 195 placed thereon is intended to be viewed during shipping. Thus, once the shipping label portion corresponding to second label 182 is removed from form 100, first adhesive layer pattern 131 (shown in FIG. 1) on the back of the first ply 110 can be used to form a bond between the label 182 and the package to which it is affixed. Another feature depicted in the figure is the use of a printed indicator 191 placed circumferentially around the first and second labels 181, 182. In a preferred configuration, the indicator 191 is a rectangle printed on the front 111 of first ply 110. By forming a closed box around two labels that are configured to have common information between them (such as matched shipping address and package contents), a user is put on additional notice that a particular label pair should be used together. By way of example, the rectangle of indicator 191 can be in a conspicuous color. In another configuration, the indicator 191 constitutes the edge of the form; such a configuration is particularly useful for large forms, such as an eight and a half by eleven inch version.

Figure 2B:
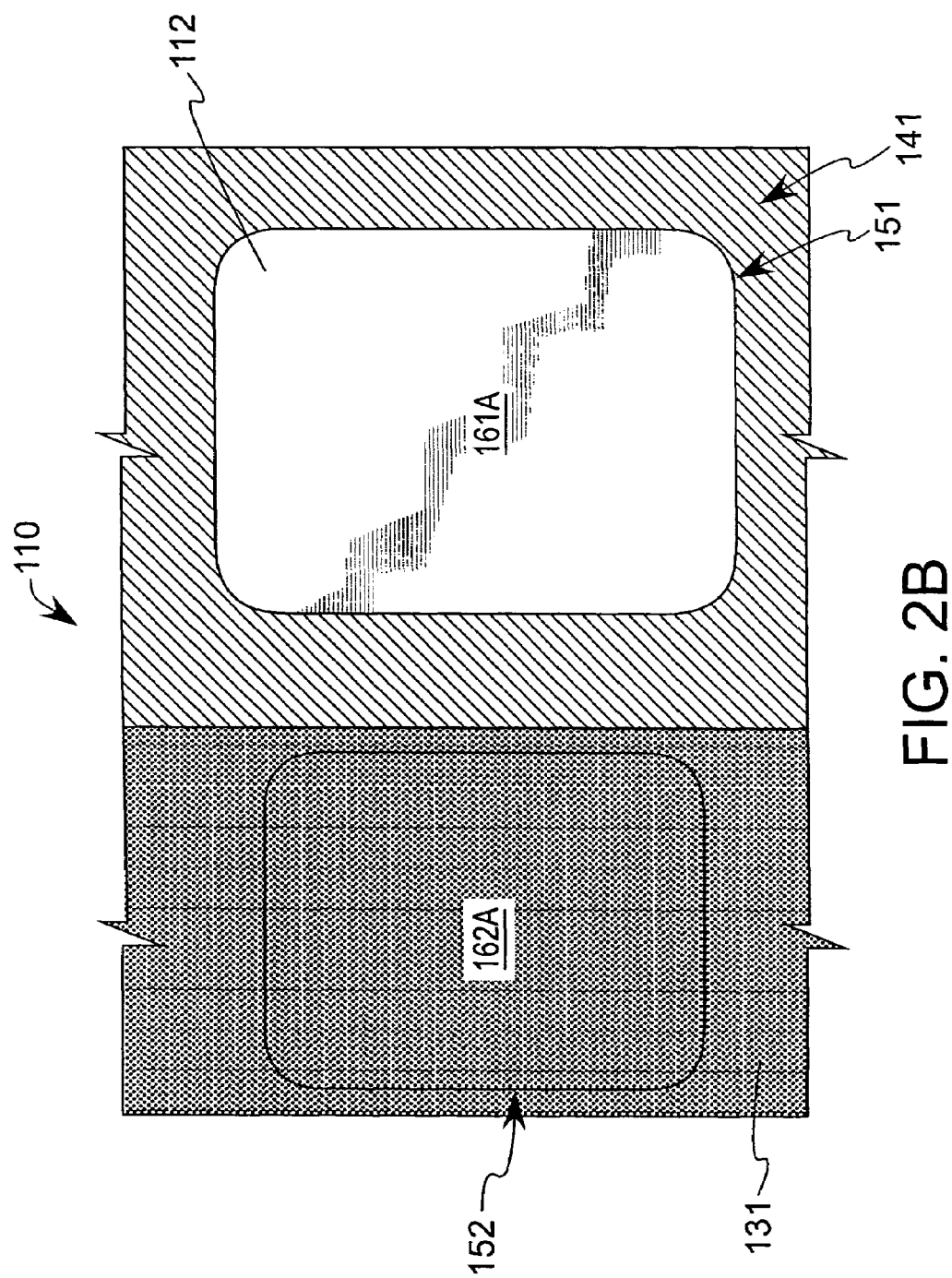
FIG. 2B is a bottom view of the first ply of FIG. 2A.

Referring next to FIG. 2B, the back 112 of the first ply 110 is shown. The patterned nature of the first release layer pattern 141 underlying first label 181 of FIG. 2A is shown, forming a "picture frame" around a region on back 112 that is coextensive with the first ply first printable region 161 of first label 181. Due to the patterning, the portion of the back 112 of first ply 110 that lies within the perimeter of the top of label 181 is substantially devoid of release layer, thereby allowing adhesive (discussed later) disposed beneath to bond to the back 161A of first ply first printable region 161. The back of the first ply 110 corresponding to the first ply second printable region 162 is shown as 162A, and is preferably completely coated with first adhesive layer pattern 131. Within the line of weakness 152 is the portion defined by the top of the label 182 that corresponds to the shipping label shown in FIG. 2A. A comparison of the dimensions of the line of weakness 151 of FIG. 2A and the underlying first release layer pattern 141 of FIG. 2B shows that the line of weakness 151 is slightly larger, such that the first release layer pattern 141 is present on both sides of the line to allow for manufacturing tolerances in depositing the first release layer pattern 141.

Figure 3A:
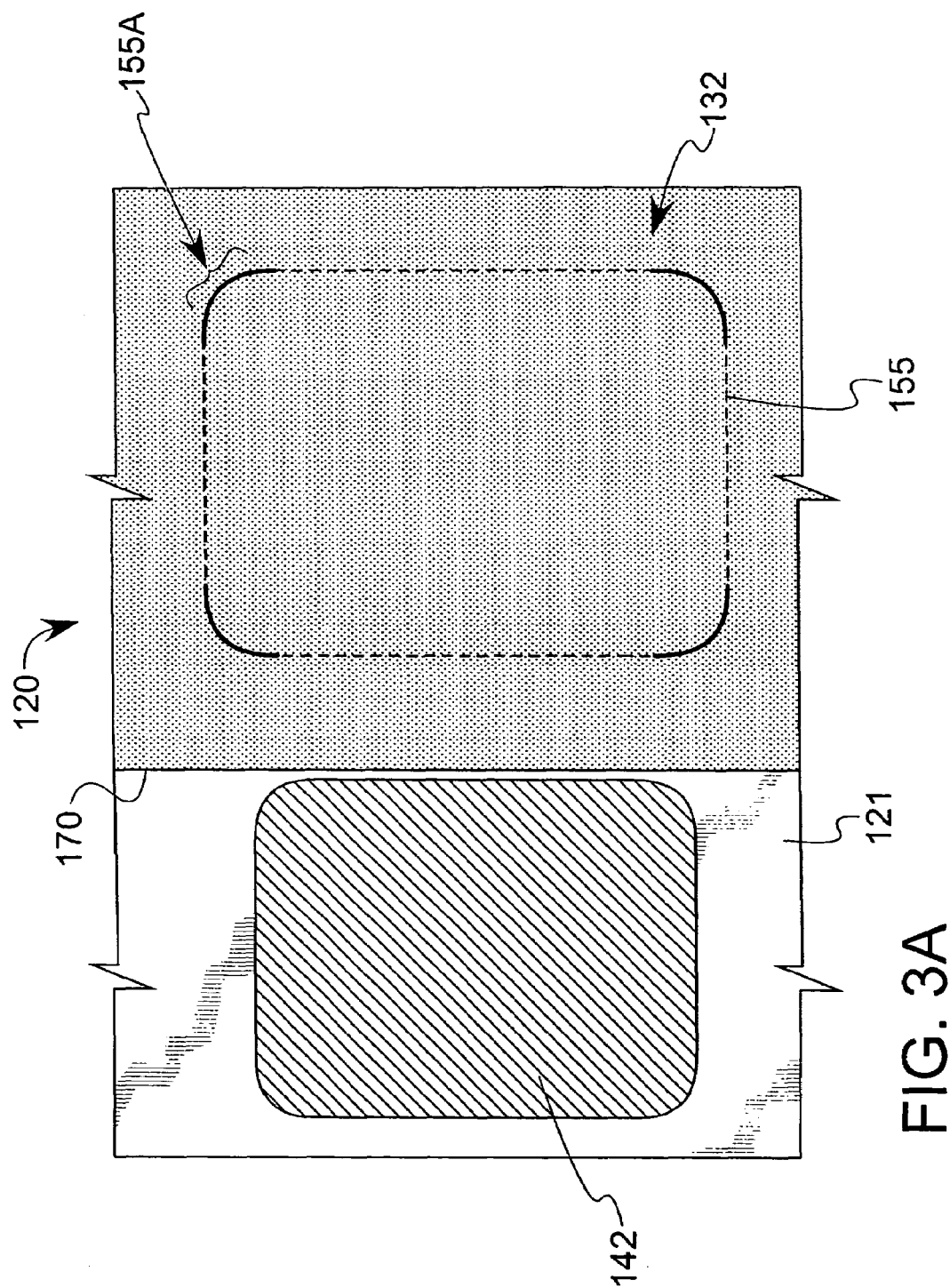
FIG. 3A is top view of a second ply of the form FIG. 1.

Referring next to FIG. 3A, the front 121 of second ply 120 is shown. Second adhesive layer pattern 132 preferably occupies the substantial entirety of front 121 that corresponds to first label 181, while line of weakness 155 defines a portion of first label 181 that can be removed from form 100, as will be discussed later. While the line of weakness 155 is shown as a series of perforations, it will be appreciated by those skilled in the art that the lines could also be formed from either a continuous (i.e., full) or intermittent cut. Corners 155A defined in the line of weakness 155 are shown as continuous cuts, thus making it easier for a user to grasp prior to removal from the remainder of the form 100. The shape of the bottom that fits coextensively beneath the second label 182 that corresponds to the shipping label portion of first ply 110 is defined by the area on second ply 120 that is covered with second release layer pattern 142. The construction of the second (shipping) label 182 allows ease of separation between the second label 182 containing first ply second printable region 162 on first ply 110 and second ply 120 such that the first adhesive layer pattern 131 shown in FIG. 2B can be subsequently used to affix the second label 182 coinciding with first ply second printable region 162 of FIG. 2A to a package. In one configuration, the second release layer pattern 142 is sized such that its outer boundary substantially coincides with that of the lines of weakness 152. As discussed above, the second release layer pattern 142 preferably extends slightly beyond the periphery of the printable region 162 defined by the lines of weakness 152, thus ensuring that the line of weakness 155 is not formed in contact with a layer of adhesive (not presently shown). It will be understood that in the interest of allowing relatively relaxed manufacturing tolerances (and their attendant cost savings), all instances where the release layer and the line of weakness are shown in a substantially coextensive relationship in the present invention can actually include slight release layer overlap as discussed above.

Figure 3C:
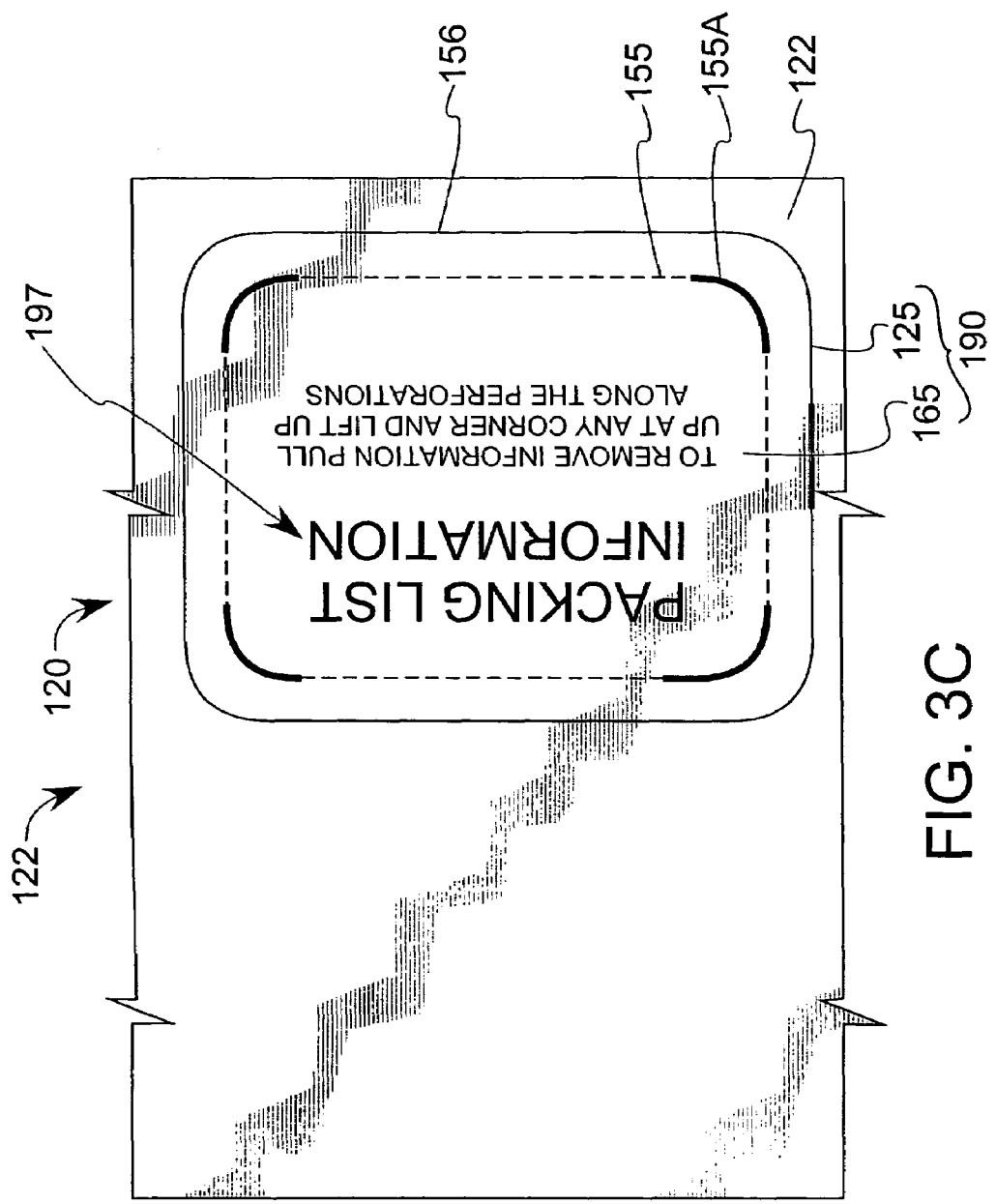
FIG. 3C is an alternate embodiment of the bottom view of the second ply of FIG. 3B.

Referring next to FIGS. 3B and 3C, the back 122 of second ply 120 is shown. Referring with particularity to FIG. 3B, the two portions of the back 122 that correspond to the shipping label and packing list are substantially coplanar with one another. In addition, their construction is such that the entire lower surface defined by second ply 120 is formed out of a single (unitary) web. Cut line 170 is subsequently placed between the portion corresponding to the shipping label and packing list to define one outer boundary of the separable region 190 of the second ply 120. By pulling at designated area 175 adjacent printed instructions, the entire separable region 190 (i.e., the affixing region 125 and the second ply printable region 165), as well as presently unseen first ply first printable region 161 that in collectively define first label 181, separates from the second ply 120, after which the two may be placed on the surface of an object, such as a shipping package. Lines of weakness 155 (shown notionally as a perforated line), along with corners 155A (with their continuous cuts) highlight the demarcation between the label 181 that is to be affixed to an object and the remainder of the form 100. The construction of form 100 is such that fixed printed indicia 197, which can include packing list information, removal instructions or the like, is viewable when affixed to a package. Thus, upon removal of separable region 190 and subsequent placement of the packing list onto a package, the fixed printed indicia 197 is face-up relative to the package surface. Removal of the packing list is effected by grasping one of the corners 155A of line of weakness 155 and peeling away the label 181 containing the printable regions 161, 165. In another configuration, shown with particularity in FIG. 3C, in lieu of cut line 170, a line of weakness 156 can be placed circumferentially around existing line of weakness 155. Preferably, this additional line of weakness 156 is a full die cut, thereby facilitating ease of removal of printable regions 161, 165.

Figure 4A:
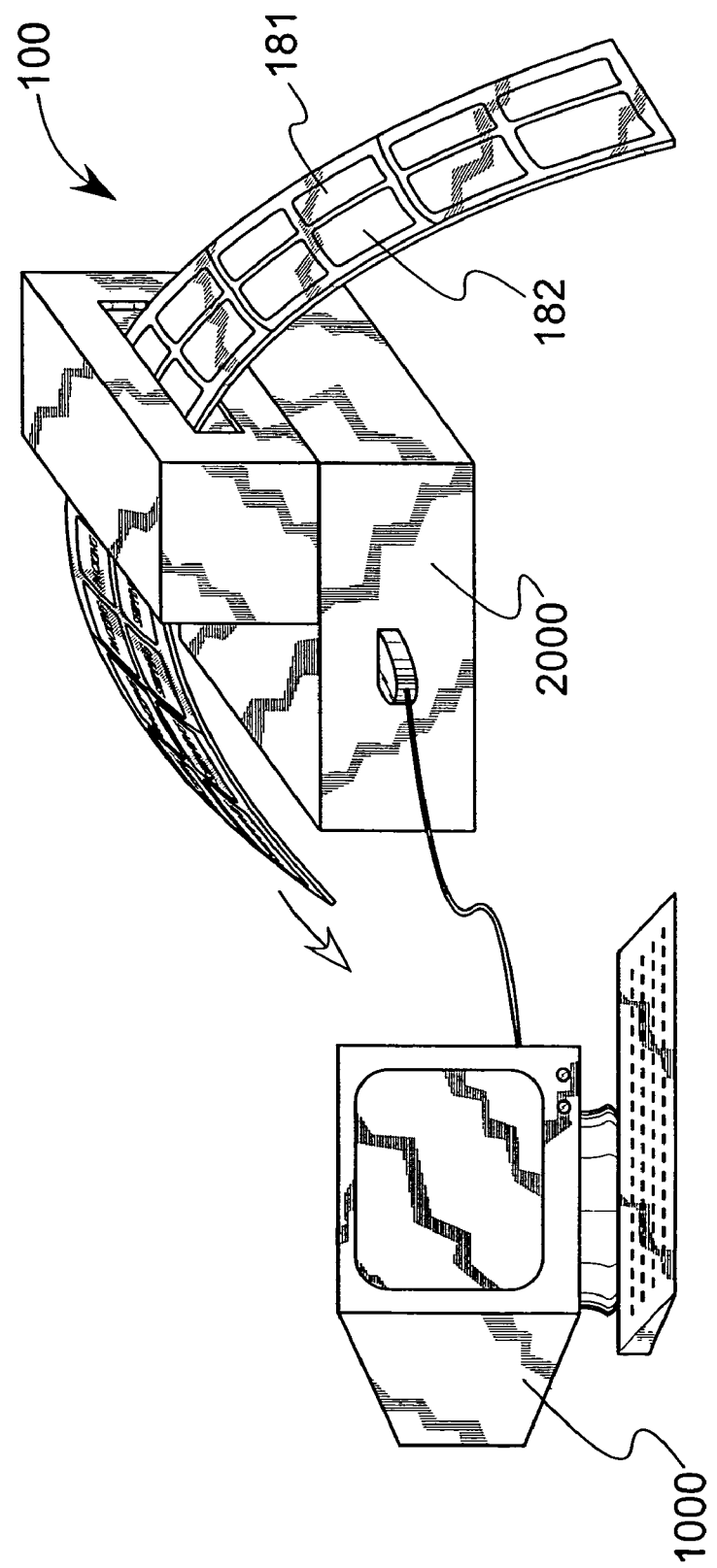
FIG. 4A is a perspective view of a continuous roll of the forms of FIG. 1 passing through a single-side printing device.
Figure 4B:
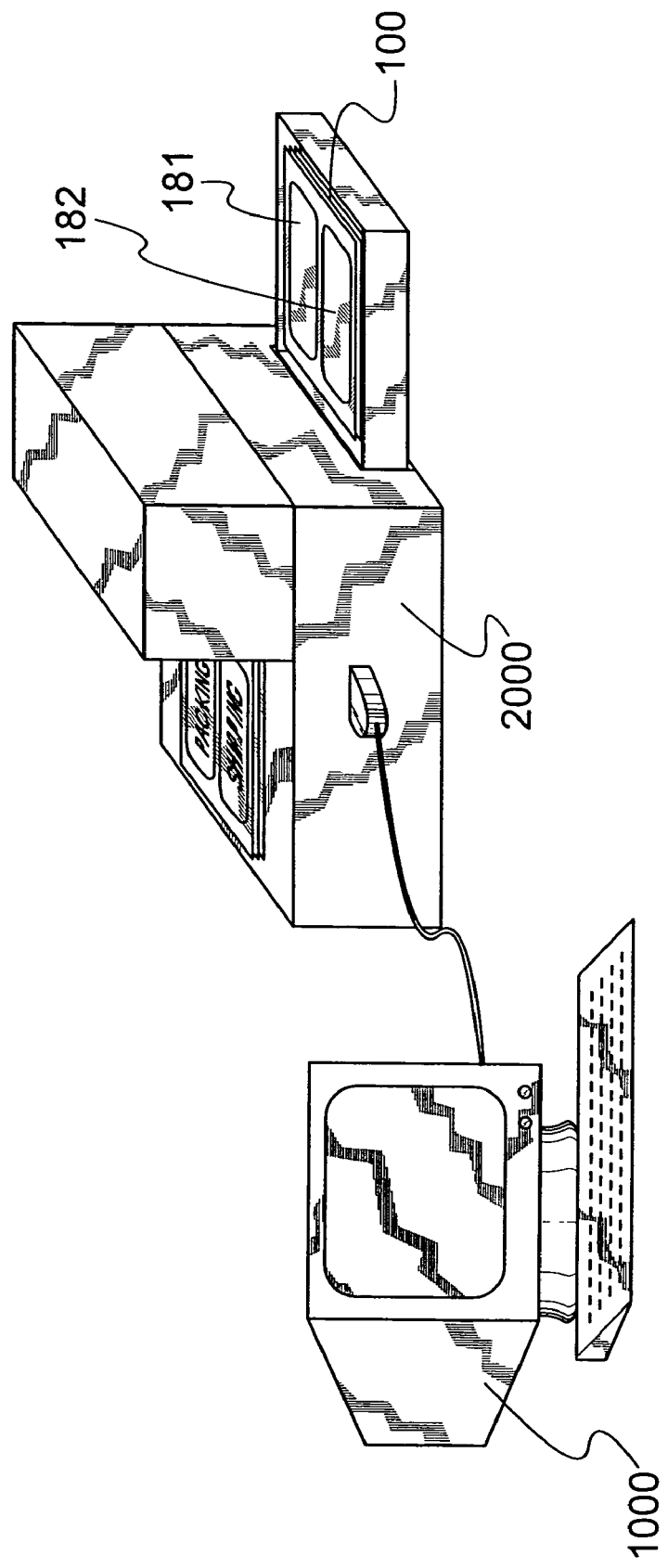
FIG. 4B is a perspective view of individual cut sheets of the forms of FIG. 1 passing through a single-side printing device.

Referring next to FIGS. 4A and 4B, printing of indicia onto labels 181 and 182 is shown. Computer (or similar data processing device) 1000 sends information pertaining to the indicia to be printed to printer 2000, which can be any variety of conventional automated printing devices, including (but not limited to) non-impact laser printers, ink jet printers, and thermal transfer printers, as well as impact dot matrix, train, band and daisy wheel printers. As shown with particularity in FIG. 4A, the printer can accept a continuous roll or web containing forms 100 (which is shown with the first and second labels 181, 182 disposed laterally relative to one another), while FIG. 4B shows individual cut sheets of form 100 (also with first and second labels 181, 182 disposed laterally relative to one another) both before and after printing.

FIGS. 5A through 5E highlight the major steps in affixing a form 100 with printing applied to first and second labels 181, 182 to a package 1, while FIG. 5F shows the removal of the first label from package 1 once its corresponding portion of form 100 has been affixed thereto. Thickness of form 100 is shown exaggerated for clarity and to emphasize the multiple layers that define the form 100 in its manufactured state. Referring first to FIG. 5A, form 100 is shown with the front 111 of first ply 110 facing up. First ply first and second printable regions 161, 162 are shown after having printed indicia 195 placed on them. As discussed earlier, the packing list information shown as printed indicia 195 on first label 181 is preferably hidden from view while package is in transit; accordingly, in FIG. 5B, the form 100 is turned upside-down relative to FIG. 5A so that this information can be placed face-down onto the package. As such, the second ply printable region 165 (that contains printed indicia that contains instructions, marking indicating that the packing list lies underneath, or the like) is disposed on the opposite side of first label 181 is now face-up and ready for removal from form 100. FIG. 5C shows the first label 181 being separated from form 100 by peeling designated area 175 along cut line 170 such that separable region 190 (including second ply printable region 165 and its corresponding affixing region 125), as well as second adhesive layer pattern 132 and first layer first printable region 161 that are adhered to it separate from form 100, leaving second adhesive layer pattern 132 exposed. FIG. 5D shows how the shipping label corresponding to second label 182 can be peeled away from the remainder of form 100. The form shown in FIG. 5D has, at the time the second label 182 is removed, already had first label 181 removed therefrom. In this circumstance, the remainder of form 100 may then be discarded. FIG. 5E shows the subsequent placement of first label 181 onto package 1, where the exposed adhesive layer 132 shown in FIG. 5C is placed onto the surface of package 1 to form an adhesive bond between them. It will be appreciated by those skilled in the art that the order of removal of the first and second labels 181, 182 is not critical. Now-exposed first adhesive layer pattern 131 can be used to affix the shipping label to the package 1 in a manner similar to that described above for first label 181. Depending on the nature of the adhesive used, the shipping label 182 becomes permanently affixed to the package 1 so that both may be discarded once the package arrives at its destination and the contents have been removed. FIG. 5F shows how the packing list portion of label 181 is removed therefrom so that the recipient of the package can check the package contents against the printed indicia 195 shown on first ply first printable region 161 of the previously-hidden list. Upon removal of the packing list, a frame made up of the affixing region 125 remains affixed to the package 1.

Figure 7A:
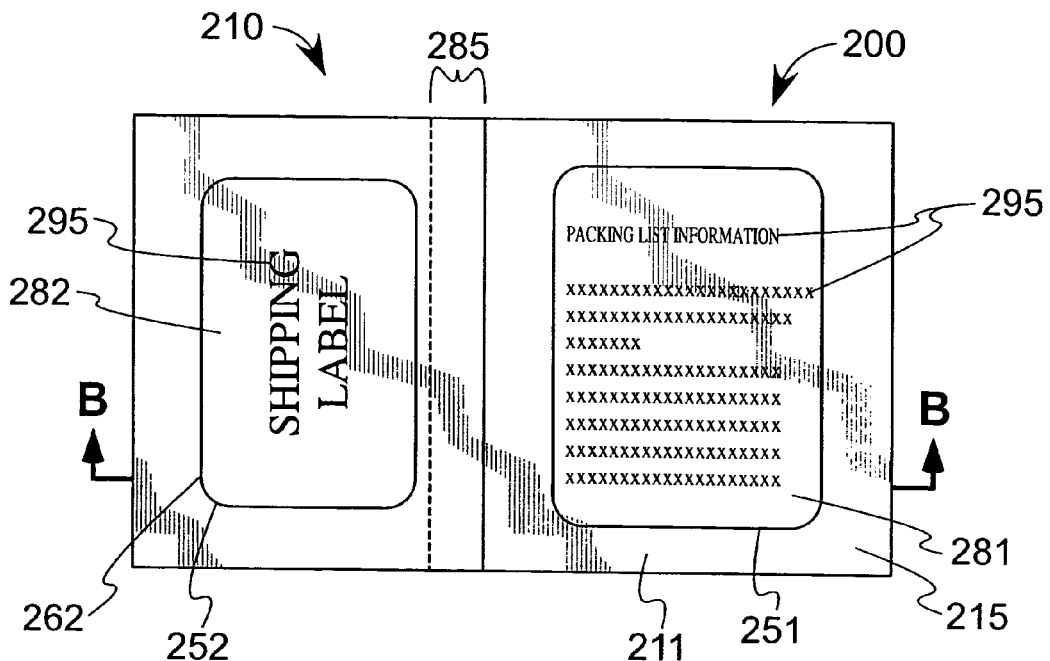
FIG. 7A shows an alternate embodiment of the form of FIGS. 1-5.
Figure 7B:
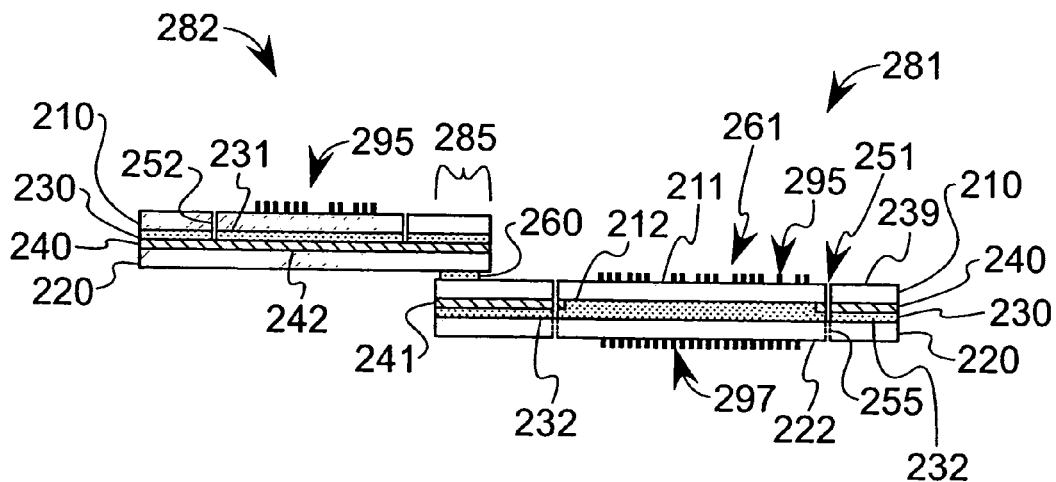
FIG. 7B shows a cutaway view of the form of FIG. 7A along line B-B.
Figure 8A:
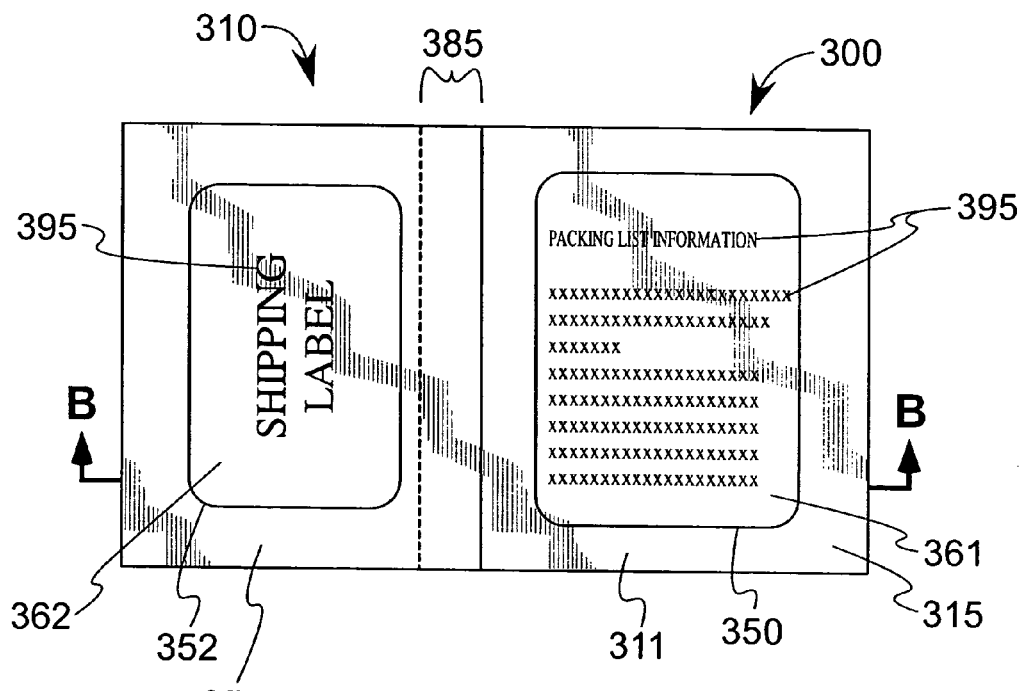
FIG. 8A shows an alternate embodiment of the form of FIGS. 1-5.
Figure 8B:
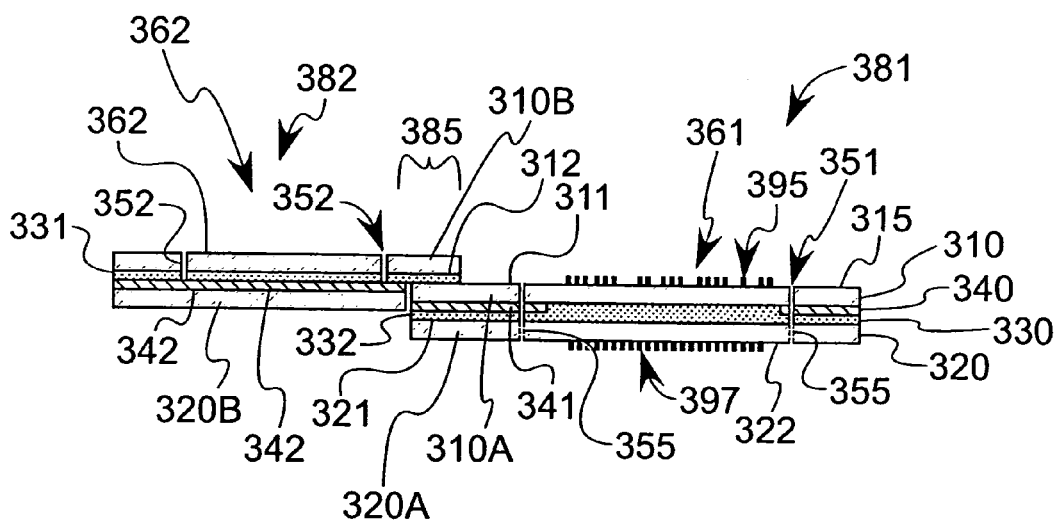
FIG. 8B shows a cutaway view of the form of FIG. 8A along line B-B.
Figure 9:
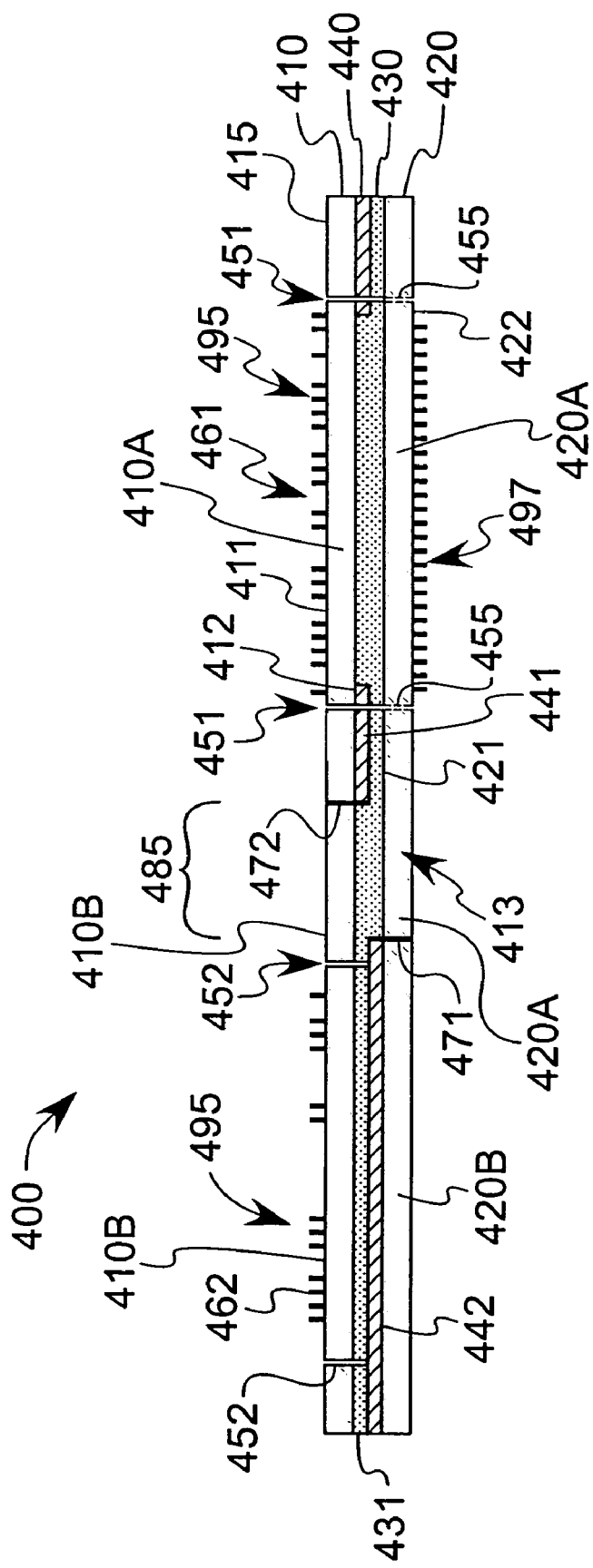
FIG. 9 shows yet an alternate embodiment of the form of FIGS. 1-5.

Referring next to FIGS. 7A, 7B, 8A, 8B and 9, alternate constructions of the form 100 are shown, where some degree of overlap between the first and second labels is present. Referring with particularity to FIGS. 7A and 7B, the faces of adjacent first and second labels 281, 282 are not substantially coplanar with one another; instead, a glue layer 260 is disposed between overlapping lateral sides of the two labels such that an overlap region 285 in the form of a seam is formed between the two labels 281, 282. This seam can result in non-coplanar (as shown in FIGS. 7B and 8B), or substantially coplanar (as shown in FIG. 9) construction. As shown in FIG. 7B, the back 222 of second ply 220 of second label 282 (that corresponds to the shipping label) is glued to a portion of the front 211 of first ply 210 of the first label 281. This permits the plies and layers making up the labels 281 and 282 to be made from different material, if desired. Referring with particularity to FIGS. 8A and 8B, form 300 differs from form 200 of FIGS. 7A and 7B by having the thickness of the overlap 385 reduced by eliminating the glue layer and removing a strip of second ply 320B and corresponding second release layer pattern 342 from second label 382. This allows the downward-facing exposed first adhesive layer pattern 331 on the back 312 of shipping label first ply 310B to be affixed to the front 311 of the portion of the packing list first ply 310A. The width of the strip of second ply 320B removed from second label 382 is sufficient to ensure adequate bonding between the overlapped labels, but not so big as to cut into the region defined by the first ply second printable region 362. The removed portions from second label 382 result in a non-coplanar relationship between the two labels 381, 382, as evidenced by the bottom side vertical offset between the two second plies 320A, 320B, as well as the top side vertical offset between the two first plies 310A, 310B. The advantage of the device depicted in FIGS. 8A and 8B is that it could eliminate the need for a separate glue to bond the two labels together, as well as reduce the thickness in the overlap region. Referring with particularity to FIG. 9, a variation of form 300 of FIGS. 8A and 8B is shown, where form 400 combines the substantially coplanar construction of FIG. 1 with the overlap between adjacent layers of FIGS. 8A and 8B. Here, the top surfaces of two webs (which can define, for example, the aforementioned packing list and shipping label) are joined along a lateral seam 472, while the corresponding bottom surfaces are joined along a lateral seam 471, the two seams offset relative to one another to define respective lateral boundaries of overlap region 485. A strip of second ply 420B (that corresponds to the shipping label) and a strip of first ply 410A (that corresponds to the packing list) are absent within the overlap region 485. A strip of first ply 410B is bonded to a strip of second ply 420A within region 485 by adhesive 430 (which could, in the alternate, be a combination of the two separate adhesive layer patterns 431 and 432). This configuration has the advantage of facilitating automated printing, as the coplanar front 411 of first ply 410 (made up of separate first plies 410A and 410B) as well as the coplanar back 422 of second ply 420 (made up of separate second plies 420A and 420B) permits stacks of cut sheets of form 400 to fit within a printer tray without leaning or surface undulations caused by the thicker overlap region. This is a thinner version of the form of FIGS. 8A and 8B, and allows the use of different substrates for the various sides while keeping a substantially coplanar construction.

Having described the invention in detail and by reference to preferred embodiments thereof, it will be apparent that modifications and variations are possible without departing from the scope of the invention defined in the appended claims.

What is claimed is:

1. A combination packing list and shipping label form configured to be affixed to an object, said form comprising:
   a packing list comprising:
      a packing list first ply comprising a front and a back opposite said front;
      a first line of weakness formed in said front of said packing list first ply such that a first printable region is bounded by said packing list first line of weakness, said first printable region configured to include variable printed indicia thereon;
      a patterned release layer facing said back of said packing list first ply;
      an adhesive layer facing each of said back of said packing list first ply and said patterned release layer;
      a packing list second ply comprising a front and a back opposite said front, said packing list second ply facing said adhesive layer such that at least a portion of said front of said second ply is bonded to at least a portion of said back of said first ply to define a multi-ply label;
      a packing list second line of weakness formed in said back of said packing list second ply such that a second printable region is bounded by said packing list second line of weakness and wherein said second printable region comprises printing of only pre-printed indicia; and
   a shipping label contiguous with said packing list, said shipping label comprising:
      a shipping label first ply comprising a front and a back opposite said front, said front configured to receive variable address indicia printed thereon;
      a shipping label line of weakness formed through at least said shipping label first ply to aid in removing said shipping label from said form;
      an adhesive layer on said back of said shipping label first ply;
      a second release layer facing at least a portion of said adhesive layer; and
      a shipping label second ply comprising a front and a back opposite said front such that upon separation of said shipping label first ply along said shipping label line of weakness, said front of said shipping label second ply retains and exposes said second release layer while said back of said shipping label first ply retains and exposes said shipping label adhesive layer.

2. The form of claim 1, wherein said packing list second line of weakness is disposed substantially coextensive with said packing list first line of weakness.

3. The form of claim 1, further comprising:
   a separable region disposed about said packing list second line of weakness; and
   a border region disposed about said shipping label line of weakness.

4. The form of claim 3, wherein said separable region comprises said packing list second printable region and an affixing region adjacent said packing list second printable region.

5. The form of claim 1, whereby said form is configured such that said fronts of said first plies of said shipping label and said packing list are substantially coplanar with one another.

6. A label set comprising:
   a form comprising a first ply and a second ply, each of said plies with an inner surface and an outer surface; and
   a plurality of labels defined in said form, at least one of said plurality of labels separable from said form along a corresponding line of weakness, said plurality of labels comprising:
      a first label comprising a first printable region comprising variable printed indicia printed thereon and wherein said first printable region is on said outer surface of said first ply, a second printable region comprising printing of only pre-printed indicia on said outer surface of said second ply that faces an opposite direction of said first printable region and is substantially coextensive therewith, an affixing region at least partially disposed about said second printable region and configured to remain with said first label upon removal thereof from said form, a first label adhesive layer coupled to said inner surface of said second ply, a first label release layer disposed between at least a portion of said inner surface of said first ply and said first label adhesive layer, said first label release layer and said first label adhesive layer cooperative with one another and said corresponding line of weakness such that upon removal of said first label from said form, at least a portion of said first label adhesive layer that is coextensive with said affixing region becomes exposed to allow said first label to be adhesively affixed to an object with said first printable region facing against said object; and
      a second label comprising a third printable region comprising variable printed address indicia and on a different portion of said outer surface of said first ply from said first label, a second label adhesive layer coupled to said inner surface of said first ply, a second label release layer disposed between at least a portion of said inner surface of said second ply and said second label adhesive layer, said second label release layer and said second label adhesive layer cooperative with one another such that upon removal of said second label, said second label adhesive layer becomes exposed to allow said second label to be adhesively affixed to an object wherein said variable printed address indicia faces away from said object, and wherein said form is configured such that at least said printable regions on each said first and second labels of said label set corresponding to said first ply comprise variable printed indicia thereon from a single pass through an automated simplex printing device.

7. The label set of claim 6, further comprising a separable region that is at least partially bounded along a cut line that extends depthwise through at least said second ply and lengthwise substantially from one edge of said second ply to another.

8. The label set of claim 6, wherein said second printable region is permanently adhered to said first printable region.

9. The label set of claim 6, wherein said form is a cut sheet.

10. The label set of claim 6, wherein said form is a continuous flat pack or roll.

11. The label set of claim 6, wherein said third printable region is disposed laterally adjacent said first ply first printable region on said form.

12. The label set of claim 6, wherein said third printable region is disposed longitudinally adjacent said first printable region on said form.

13. The label set of claim 6, wherein said first label defines a packing list.

14. The label set of claim 13, wherein said second label defines a shipping label.

15. The label set of claim 13, wherein said adhesive layer is disposed across a substantial entirety of said front of said second ply that corresponds to said packing list.

16. The label set of claim 15, wherein said adhesive layer is disposed across a substantial entirety of said back of said first ply corresponding to said second label.

17. The label set of claim 15, wherein said release layer disposed between said first and second plies of said first label is patterned such that it only occupies the portion outside said corresponding line of weakness defined in said first printable region.

18. The label set of claim 6, wherein at least one of said lines of weakness comprises a full die cut.

19. The label set of claim 6, wherein at least one of said lines of weakness comprises a perforated die cut.

20. The label set of claim 6, wherein at least one of said lines of weakness is substantially rectangular in shape.

21. The label set of claim 20, wherein said lines of weakness corresponding to said first and second labels in said first ply are full die cuts, and wherein said line of weakness corresponding to said first label in said second ply is a perforated die cut.

22. The label set of claim 21, wherein at least one corner defined in said perforated die cut comprises a full die cut to facilitate ease of grasping.

23. The label set of claim 6, further comprising pre-printed indicia on a portion of said outer surface of said second ply.

24. The label set of claim 23, wherein said pre-printed indicia comprises instructional information.

25. The label set of claim 6, wherein said first label is a pricing label, return receipt, return label or coupon.

26. The label set of claim 6, further comprising an indicator disposed across said first ply printable regions to provide indicia that said first and second labels are grouped together.

27. The label set of claim 26, wherein said indicator is a generally rectangular line printed to circumscribe said first and second labels.

28. The label set of claim 6, further comprising an overlap region defined by a stacked relationship between a portion of said first ply and a portion of said second ply such that said first and second labels are not coplanar with one another.

29. The label set of claim 28, wherein said first label is stacked below said second label.

30. The label set of claim 28, wherein portions of said second ply and said release layer that both correspond to one of said labels are removed prior to construction of said form such that a cutout defined by said removed portion is substantially coextensive with a corresponding portion of said other labels.

31. The label set of claim 6, further comprising an overlap region defined by a stacked relationship between a portion of said first ply and a portion of said second ply such that said first and second labels are substantially coplanar with one another.

32. The label set of claim 31, wherein one surface of said overlap region is bounded on a lateral side by two abutting first plies that form a first side of a packing list and shipping label respectively, and another surface of said overlap region is bounded on a lateral side by two abutting second plies that form a second side of said packing list and shipping label respectively, wherein said abutting first plies are laterally offset relative to said abutting second plies such that the portion of said form disposed between said lateral offset defines said overlap region.

33. The label set of claim 6, wherein said first label comprises a first material and said second label comprises a second material, said second material being different from said first material, said form further comprising an overlap region wherein a portion of said first material adhesively overlaps a portion of said second material, bonding said first material to said second material and forming a seam therebetween.

34. A multi-label form configured such that each label can accept variable simplex printing on at least one surface thereof and be separately affixed to an object, said form comprising:

a first ply, a second ply, a release layer and an adhesive layer arranged such that said release and adhesive layers are disposed between said first and second plies to define a layered multi-ply construction;

a first label within said multi-ply construction and defined by lines of weakness that form respective borders about at least a portion of a first printable region on said first ply and a second printable region on said second ply wherein printing on said second printable region comprises only pre-printed indicia, said form configured such that the portions of said adhesive and release layers that correspond to said first label are cooperative with one another such that upon removal of said first label from said form, a portion of said adhesive layer that corresponds to said first label and that at least partially surrounds said first printable region becomes exposed and stays with said second ply such that said first label can be adhesively affixed to the object with said first printable region facing toward the object wherein said first printable region comprises variable indicia printed thereon; and a second label defining a third printable region comprising variable address indicia printed thereon, said second label constructed differently from and disposed adjacent said first label on said first ply, said second label formed within said multi-ply construction such that portions of said adhesive and release layers that correspond to said second label are cooperative with one another such that upon removal of said second label from said form, said adhesive layer that corresponds to said second label becomes exposed and stays with said first ply such that said second label can be adhesively affixed to the object with said variable address indicia facing away from said object.

35. The form of claim 34, wherein at least a portion of said first release layer is patterned.

36. The form of claim 34, wherein said first and third printable regions are substantially coplanar with one another.

37. The form of claim 34, further comprising an overlap region between said first label and said second label such that a portion of said form that corresponds to one of said labels adhesively overlaps a portion that corresponds to the other of said labels.

38. The form of claim 34, wherein said first label defines a packing list.

39. The form of claim 34, wherein said second label defines a shipping label.

\* \* \* \* \*